United States Patent
Edholm et al.

(10) Patent No.: US 9,027,020 B2
(45) Date of Patent: May 5, 2015

(54) DATA AND STATE THREADING FOR VIRTUALIZED PARTITION MANAGEMENT

(75) Inventors: Phil Edholm, Pleasanton (CA); Harvey Waxman, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 549 days.

(21) Appl. No.: 13/345,503

(22) Filed: Jan. 6, 2012

(65) Prior Publication Data

US 2013/0179880 A1      Jul. 11, 2013

(51) Int. Cl.
*G06F 9/455* (2006.01)
*G06F 9/50* (2006.01)

(52) U.S. Cl.
CPC .......... *G06F 9/45558* (2013.01); *G06F 9/5077* (2013.01); *G06F 9/5083* (2013.01); *G06F 2009/45575* (2013.01)

(58) Field of Classification Search
CPC ........ G06F 9/5077; G06F 9/5083; G06F 9/50
USPC ........................................................... 718/1
See application file for complete search history.

(56) References Cited

U.S. PATENT DOCUMENTS

| | | | |
|---|---|---|---|
| 7,797,507 B2 | | 9/2010 | Tago |
| 8,122,055 B2* | | 2/2012 | Grewal et al. ................ 718/100 |
| 2009/0217286 A1* | | 8/2009 | Schmidbauer et al. ....... 718/105 |

OTHER PUBLICATIONS

Jin et al. "The Effectiveness of Deduplication on Virtual Machine Disk Images," Systor, May 2009, Haifa, Israel, 12 pages.
Zamorano et al. "Open Source Implementation of Hierarchical Scheduling for Integrated Modular Avionics," Proceedings of Real-Time Linux Workshop, Nairobi, Oct. 25-27, 2010, 5 pages.

* cited by examiner

*Primary Examiner* — Jaweed A Abbaszadeh
*Assistant Examiner* — Xuxing Chen
(74) *Attorney, Agent, or Firm* — Sheridan Ross P.C.

(57) ABSTRACT

The system includes a virtualized environment having at least one partition. An instance of an application executes in the partition. The application instance is not dedicated to a single user or element. Rather, the application instance may be shared or parsed out to two or more users or elements. To accomplish this sharing, the static data (which is common to all the elements or users) may be maintained in the partition or is loaded at runtime. The dynamic data (the data which is unique to each instantiation and associated with the element requesting the application) can be loaded when an instance is dedicated to execute for a particular element or user. Thus, various elements can share instances of an application and there need not be instances dedicated to particular elements.

20 Claims, 10 Drawing Sheets

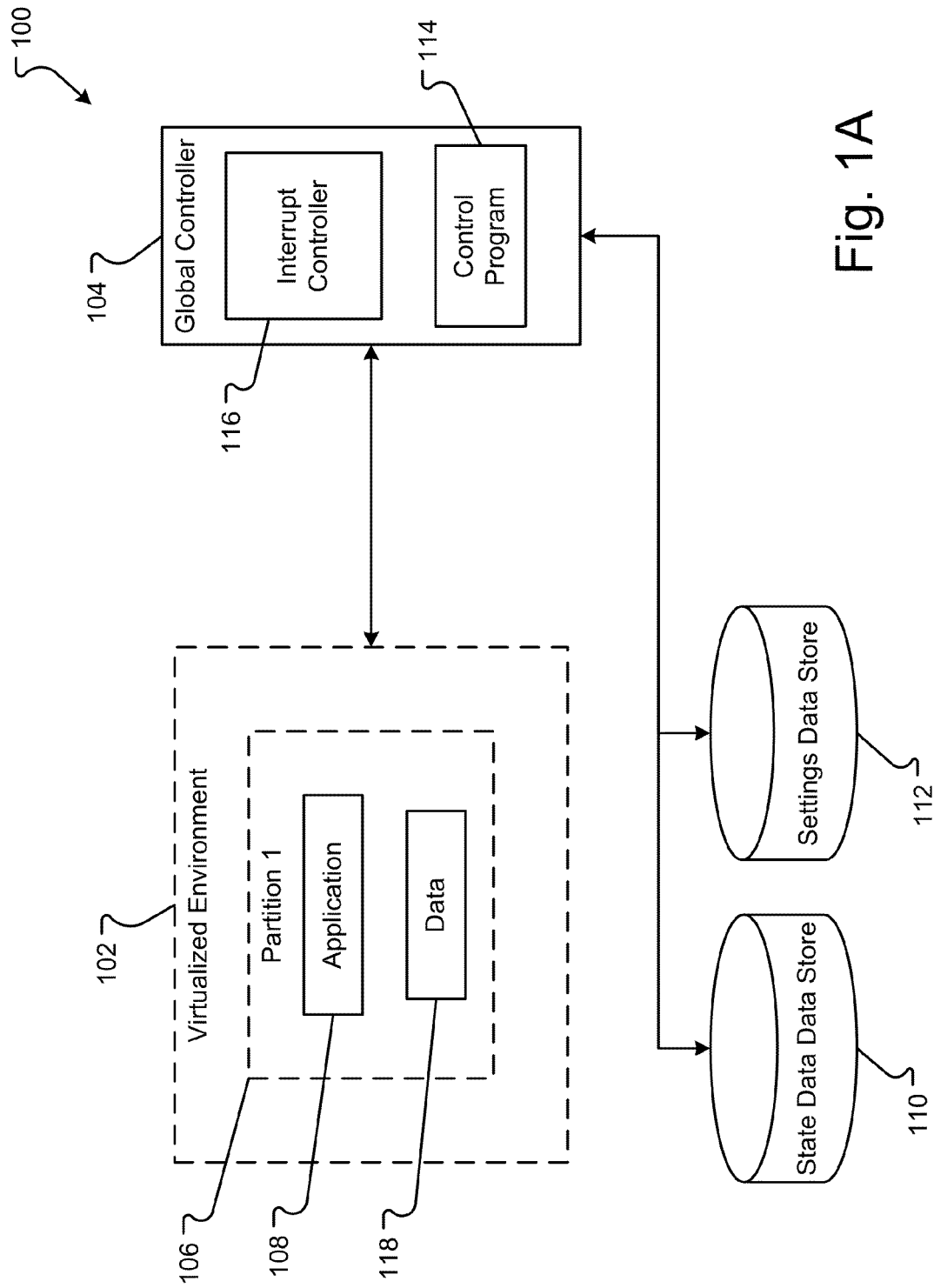

DATA AND STATE THREADING FOR VIRTUALIZED PARTITION MANAGEMENT

BACKGROUND

The virtualization of applications and processes is generally understood. In some cases, the virtualized environment can consumer a large number of resources based on the usage of the applications in the environment and the size or complexity of the applications. For example, a virtual machine (VM), in a virtualized environment and running a single enterprise instantiation of an application, requires dedicated memory for the application to be ready to process an event or activity. However, the timing of the events often occurs far apart, much of the time these applications may be doing little processing, but the current virtualization environments require the applications to be running to process events.

For example, in a communications application supporting 20 users, each users may generate a maximum of 20 SIP events per hour (e.g., phone calls, call forwards, no answer, etc.), resulting in 400 events per hour. If the average time to process and complete an event is 50 milliseconds, the user causes actual activity of 20 seconds for the application, resulting in actual utilization of less than 0.5%. As these types of programs need to be continually available, it is difficult to scale the number of served instances without also linearly increasing the number of resources provided for executing the programs—although the programs do not execute all the time. Thus, the problem is how to increase the elasticity of a large scale solution without resorting to a redesigned application that can partition multiple customers within a single VM instantiation.

For software modules that have a relative large static size (based on the number of applications executing and the size of the applications), most current mechanisms have low granularity and a slow response to initialization. For example, for a process that is 100 Mbytes, and if the process requires 1 hour of processing, the effective use of resources is 1 hour×100 Mbytes. So any event requiring that resource would generate 100 MBH of data storage and require the defined processing, even if it was a single event lasting 10 seconds. Also, the time to load the 100 Mbytes of data makes it challenging to load in real time to respond to requests in a sufficiently succinct manner.

SUMMARY

It is with respect to the above issues and other problems that the embodiments presented herein were contemplated. The system includes a virtualized environment having at least one partition. An instance of an application executes in the partition. The application instance is not dedicated to a tenant (e.g., single user, customer, or element). Rather, the application instance may be shared or parsed out to two or tenants. To accomplish this sharing, the common program/data (which is common to all the tenants) is maintained in the partition as a continuous basic program. The dynamic data (i.e., the data which is unique to each tenant and associated with the tenant requesting the application) can be loaded when a specific tenant instance is required to execute for a particular tenant or user. Thus, various tenants can share instances of an application and there need not be continuous VM instances dedicated to particular tenants. As generally the tenant specific data (i.e., static and dynamic data) is relatively small compared to the program, by only loading the static/dynamic tenant data when the application is requested for that tenant, the amount of time required to begin execution for an element is drastically reduced. This combination of features allows for the expansion of the virtualized environment without the requiring a concomitant increase in processing or memory resources dedicated to the virtualized environment.

Embodiments described herein can support multiple simultaneous partitions and treat each partition as a separate available resource and provide a mechanism to load the state/data for the actual tenant/process only. For example, in an application like the IPO/SC, of the 100 Mbytes of partition, less than 1 Mbyte is actually unique to the tenant or element requesting execution of the application, the other 99 Mbytes are common programming/data used in all instances of the application. The embodiments can retain the 99 Mbytes in the partition and only load in the 1 Mbyte necessary for the partition to take on the attributes of the specific instantiation and begin processing. In addition, the system can monitor the partitions and signal the control system when the partition reaches a quite state so that the tenant data/state can be unloaded and stored, and the partition made available for another tenant/instantiation.

In addition to the base program, that monitors the partition and stores the unique data/state, the embodiments can also allow for a set of partition data that defines different base implementations. For example, there may be separate versions of an application that have different common programs/data based on the relative level of value/complexity. For example there might be a version with 99 Mbytes of base memory usage; there could be a version with 299 Mbytes and a version with 499 Mbytes, with the larger versions having more functionality and complexity. The differentiated characteristics can generate multiple "classes" of partitions, where a specific instantiation/tenant may use only the appropriate type/size of partition or may be a capable of being supported by "larger" partitions. For example, if a 99 Mb tenant needed to be processed and there were no 99 Mb partitions available, a 299 Mb partition could be used. The embodiments can allow further gradation and optimization of the environment. The embodiments may include the capability to dynamically commission and de-commission partitions based on analysis of tenant demand and use cycles.

With the clean separation of data/program and ability to re-instantiate an instance by reloading only data, the embodiments provides for new models of resiliency. The data can be partitioned into three parts—relatively static configuration data (i.e., data for the configuration of the tenant), relatively dynamic state information (i.e., data that is dynamically changing with the tenant state), and relatively static log information (i.e., data that is generated as output from the system). The static and dynamic tenant groups are required for rapid failover by rapidly reloading a current data set. Thus, swapping out data sets provides for recovery from a processor failure, by having the dataset duplicated and recovered by a processor after a data store failure, and having a duplicate set updated faster than a full swap out, which provides better state management/recovery. In other words, each event becomes a separate processing activity and an opportunity to re-deploy to an active, available system. In the event a specific tenant is running in a partition and the processor/server/memory of that partition fails, the event management process can re-insatiate the application instance, from the beginning of that specific event, in a new available partition.

For specific processing environments where the length of an event in real time is significantly longer than the required processing time, embodiments can be augmented by having multiple tenants' static/dynamic data loaded in the active memory for the duration of the real-time event. This loading of data allows the program to operate on each of these loaded data sets as a separate tenant instance, without the small time/system cost of loading each tenant into memory. For example, a processing event that has a human/real-time duration of 5 seconds may only require 10-20 Msecs of actual processing. By having 20-50 tenants loaded simultaneously into the partition space, the processing can be further optimized. Unloading of a specific tenant from the partition can be based on the process completing or the specific tenant becoming "quiet".

Finally, the embodiments may include the capabilities of a Control System to dynamically scale the number of active partitions and types based on demands to optimize overall resource use. The optimization approach allows for, when a given instance is to be re-instantiated, migration to another instance of the application, which allows for a more seamless and dynamic scaling up of overall capacity. The Control System may also be responsible for managing the translation of events, which is, loading into partitions the appropriate data/state to respond to the event. The embodiments may use a rapid time domain virtualization of the resource pool in response to events in a way that is significantly more time sensitive and therefore resource optimized. The control system can further manage the multiplicity of tenant instantiations as described in paragraph [0007].

The term "virtualization," "virtualized," or "virtual" as used herein can refer to the creation of a virtual (rather than actual) version of something, such as a hardware platform, operating system, a storage device or network resources. Virtualization can refer to hardware virtualization, application virtualization, and/or other types of virtualization.

The term "hardware virtualization" as used herein can refer to the creation of a virtual machine that acts like a real computer with an operating system. Software executed on these virtual machines is separated from the underlying hardware resources. For example, a computer that is running Microsoft Windows may host a virtual machine that looks like a computer with Ubuntu Linux operating system. Subsequently, Ubuntu-based software can be run on that virtual machine. In hardware virtualization, the term host machine refers to the actual machine on which the virtualization takes place; the term guest machine, however, refers to the virtual machine. Likewise, the noun adjuncts host and guest are used to help distinguish the software that runs on the actual machine from the software that runs on the virtual machine.

The term "application virtualization" as used herein can refer to encapsulating applications from the underlying operating system on which they are executed. A fully virtualized application is not installed in the traditional sense, although it is still executed as if it were. The application is fooled at runtime into believing that it is directly interfacing with the original operating system and all the resources managed by it, when in reality it is not. In this context, the term "virtualization" refers to the artifact being encapsulated (application).

The term "tenant" as used herein describes a single instantiation of the application that is dedicated to a single user, customer, logical entity, or grouping that requires independent processing and operation.

The term "partition" as used herein can refer to a logical partition, commonly called an LPAR, which is a subset of one or more computers' hardware resources, virtualized as a separate computer. In effect, one or more physical machines can be partitioned into multiple logical partitions, each hosting a separate operating system and executing an instance of an application.

The term "element" as used herein can refer to any computing system or user that requests resources from the virtualized environment. For example, an element may be a desktop phone that requests a voice over internet telephony (VoIP) connection in a network. The element may be a user computer requesting an application that performs a function in the virtualized environment.

The term "state data" as used herein can refer to a data item that describes an atomic state of a particular object concerning a specific property at a certain time point. A collection of data items for the same object at the same time forms an object instance. Data can be numbers, words, images, etc.

The term "static state data" or "static data" as used herein can refer to data that does not change or change infrequently with execution of an application.

The term "dynamic state data" or "dynamic data" as used herein can refer to data that does change or changes more frequently with execution of an application.

The term "application" as used herein can refer to computer software designed to help a user to perform specific tasks. Thus, an application can provide services, data, or other computing capabilities to a user or other system.

The phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine", "calculate" and "compute," and variations thereof, as used herein, are used interchangeably and include any type of methodology, process, mathematical operation or technique.

The term "module" refers to any known or later developed hardware, software, firmware, artificial intelligence, fuzzy logic, or combination of hardware and software that is capable of performing the functionality associated with that element. Also, while the various concepts are described in terms of exemplary embodiments, it should be appreciated that aspects can be separately claimed.

The term "data store" as used herein can refer to a data repository of a set of integrated objects. These objects are modeled using classes defined in database schemas. Data store includes not only data repositories like databases, it is a more general concept that includes also flat files that can store data Hereinafter, "in communication" shall mean any electrical connection, whether wireless or wired, that allows two or more systems, components, modules, devices, etc. to exchange data, signals, or other information using any protocol or format.

The preceding is a simplified summary to provide an understanding of some aspects of the embodiments. This summary is neither an extensive nor exhaustive overview of the various embodiments. It is intended neither to identify key or critical elements nor to delineate the scope of the embodiments but to present selected concepts in a simplified form as an introduction to the more detailed description presented below. As will be appreciated, other embodiments are possible utilizing, alone or in combination, one or more of the features set forth above or described in detail below.

BRIEF DESCRIPTION OF THE DRAWINGS

The present disclosure is described in conjunction with the appended Figs.:

FIGS. 1A-1C are block diagrams of embodiments of a system for managing a virtualized environment;

In the appended Figs., similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the possible embodiments. Rather, the ensuing description will provide those skilled in the art with an enabling description for implementing the embodiments. Various changes may be made in the function and arrangement of elements without departing from the spirit and scope of the possible embodiments as set forth in the appended claims.

Figure 1B:
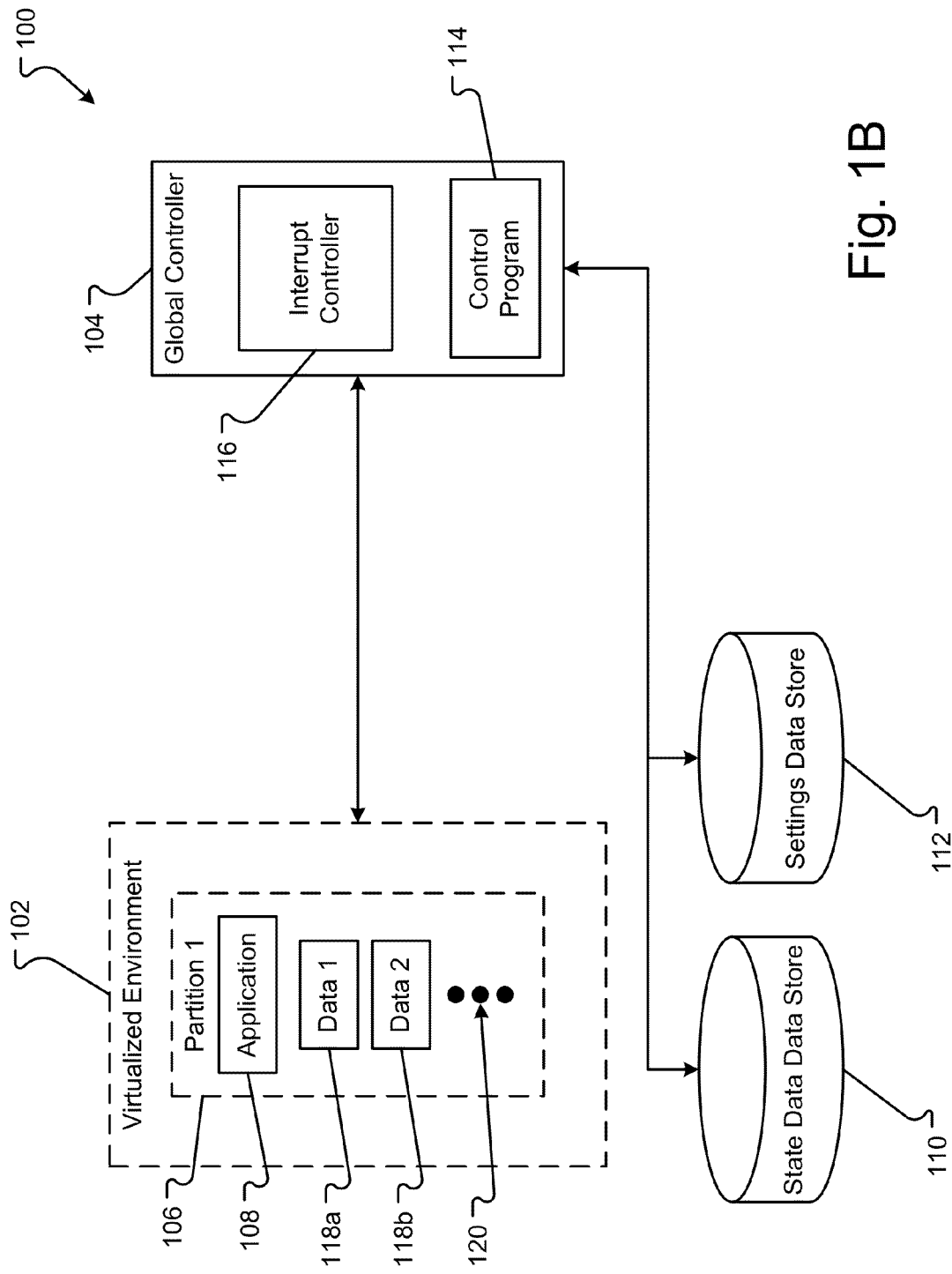
Figure 1C:
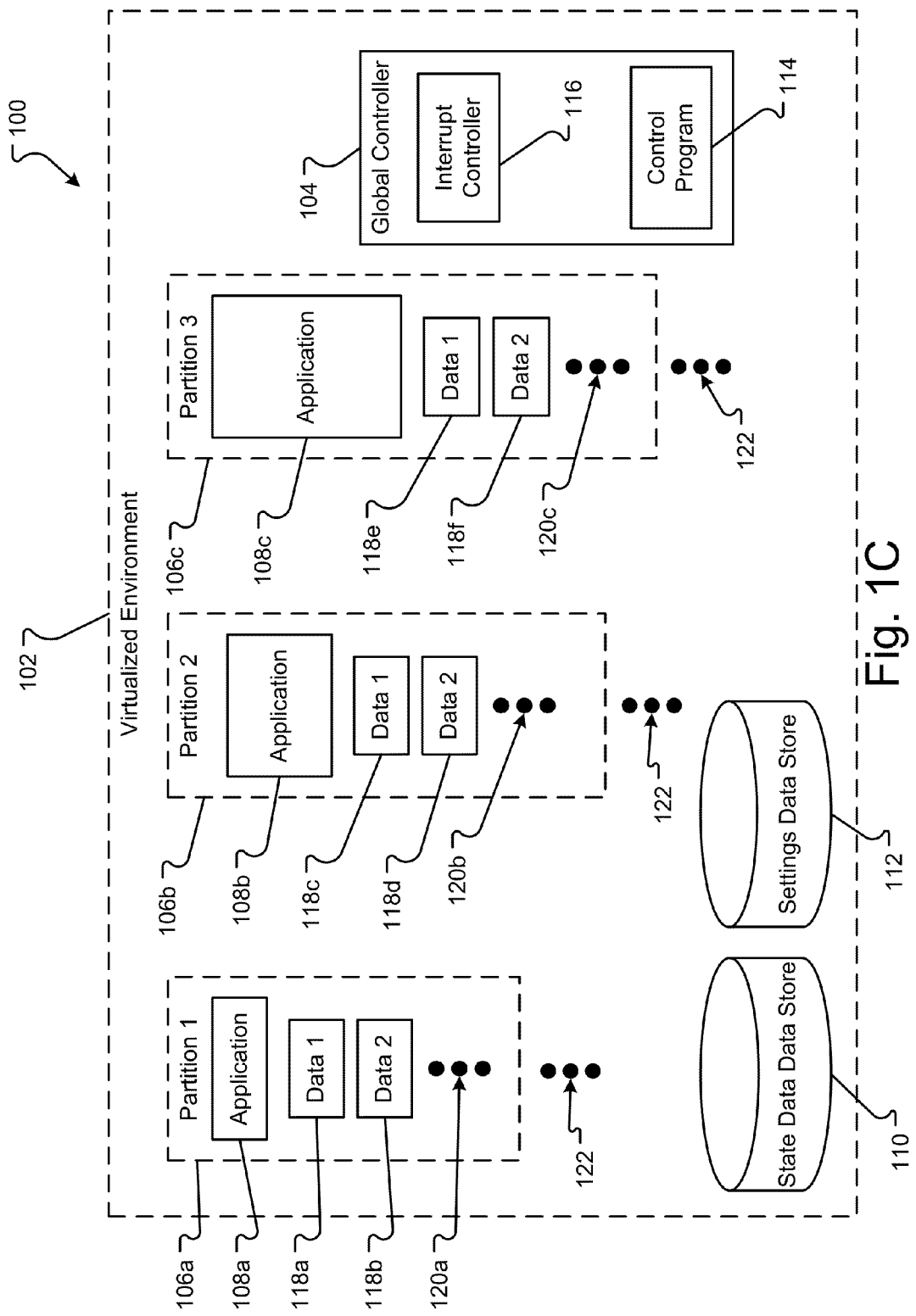

Embodiments for a system 100 for managing application execution are shown in FIGS. 1A through 1C. The system 100 includes a virtualized environment 102, which may be in communication with or include a global controller 104. A virtualized environment 102 can execute applications through virtualization, either hardware virtualization, application virtualization, or other types of virtualization. A virtualized environment 102 can be split into one or more partitions 106a, 106b, and/or 106c. In embodiments, each partition 106 can execute an instance of one or more applications 108a, 108b, and/or 108c. Thus, the partition 106 can provide all the processor resources, memory resources, and other computing resources needed to execute the application instance 108. The virtualized environment 102 can execute on one or more computer systems, as described in conjunction with FIG. 7 and/or FIG. 8. The computer systems as described in FIG. 7 and FIG. 8 can provide the computing resources required to execute the applications 108. There may be more or fewer partitions than those shown in FIGS. 1a, 1B, and/or 1C, as represented by ellipses 122.

Embodiments of the virtualized environment 102 can have different configurations. The system 100, as shown in FIG. 1A, includes a single partition 106 that with a single application 108 executing in the partition 106. Further, only one tenant set of data 118 is being used with the application 108. This set of data 118 may be associated with particular user or element. The data 118 may then be "swapped" when a different data set 118 needs to used for another element. The global controller 104 can control this swapping of data based on events, as described in conjunction with FIGS. 3-6. However, the application 108 remains active. FIG. 1A shows a basic configuration of the system 100.

In FIG. 1B, a single partition 106 still executes one application 108. However, unlike the system 100 shown in FIG. 1A, there are at least two tenants 118a and 118b. Thus, the single application can execute instances using data specific to different tenants. There may be more or fewer tenants than those shown in FIG. 1B, as represented by ellipses 120. In the embodiment shown in FIG. 1B, the application 108 can multi-thread execution of different data sets 118a, 118b associated with different elements. Thus, the partition 106 executes several tenants' threads.

Finally, in FIG. 1C, there are several partitions 106a, 106b, and/or 106c. Each partition 106 can execute a different instance of the application 108a, 108b, and/or 108c. Each partition 106 can, in turn, have several tenants 118a-118f. The number of partitions 106 and tenants 118 can be different than those shown in FIG. 1C, as represented by ellipses 120 and/or 122. Each application instance 108 can be configured differently. Thus, application instance 108a may have less functionality and require fewer resources than application instance 108c (this difference is represented by the different sizes of the application instances 108). Further, the partitions 106 may execute different applications.

The virtualized environment 102 can also include one or more data stores 110 and/or 112. The data stores 110 and/or 112 can include information about various applications, elements, or other entities. For example, the data store 110 can store state data; thus, data store 110 saves, retrieves, or maintains state data for an element that may request execution of one of the instances of the applications 106. State data can include information about the previous execution of the application 106 or include received data provided from the element for the application 106. Embodiments of state data may be as described in conjunction with FIG. 3.

The data stores 110 and/or 112 may also include a settings data store 112. The settings data store 112 can include any information required to manage or configure the virtualized environment 102. The settings may be used by a control program 114 to manage the virtualized environment 102. Settings are further described in conjunction with FIG. 5.

A global controller 104 can be an interface element between the virtualized environment 102 and one or more tenants. Thus, the global controller 104 can receive interrupts or events (e.g., a user or other system) that require an instance of an application 108 to execute. The global controller 104 can determine, with an interrupt controller 116, which application instance 108 is required and can provide the information, with the event information, to control program 114 to send that information to the correct partition 106 and correction application 108. Thus, the interrupt controller 116 can receive interrupts or events for the virtualized environment 102, and can put those events into a queue to be executed in the virtualized environment 102 and then may pass information to the control program 114 as required to have those events handled by the virtualized environment 102. The global controller 104 abstracts the virtualized environment 102 so that each element need not require its own instance of the application 108.

A control program 114 is operable to manage the partitions 106 within the virtualized environment 102. The control program 114 can determine the number of partitions 106, can determine which application 108 will execute in each partition 106, and can control the overall execution of those applications 108. Thus, as an element may require an application 108 to be executed, the control program 114 can assign that element to a specific instance of an application 10 within a partition 106. The control program 114 may be as described in conjunction with FIG. 2.

Figure 2:
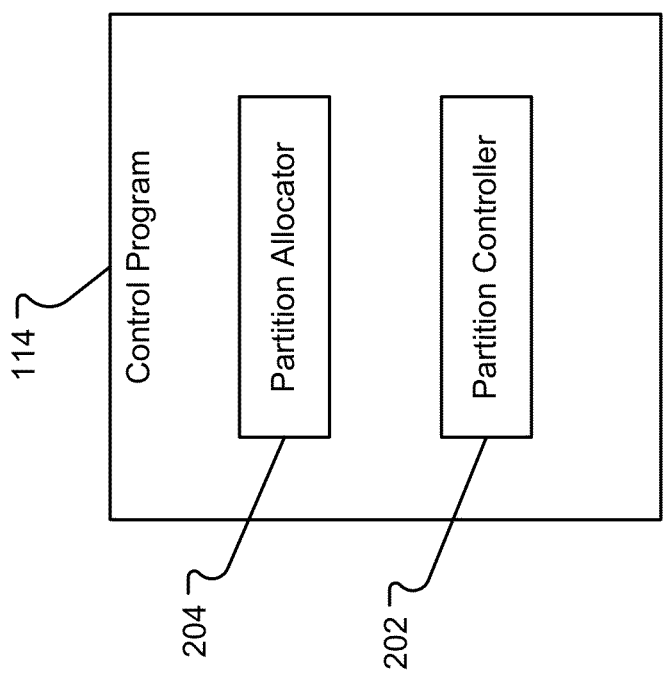
FIG. 2 is a block diagram of an embodiment of a control program that controls partitions in a virtualized environment.

An embodiment of a control program 114 is shown in FIG. 2. The control program 114 can include a partition controller 202 and a partition allocator 204. The partition allocator 204 can determine the number of partitions 106 in the virtualized environment 102. The partition allocator 204 can receive inputs of various data from the virtualized environment 102 or from elements that are using the virtualized environment 102. From this information, the partition allocator 204 can determine the number of partitions 106 required. The partition allocator 204 may then establish the partitions 106 and create data structures to manage and assign those partitions 106 to the virtualized environment 102.

A partition controller 202 can assign elements to the various partitions 106. Thus, as the interrupt controller 116 provides information to the control program 114, the partition controller 202 is operable to determine an unused instance of an application 108 in a partition 106. When determining the unused instance, the partition controller 202 can send the interrupt or event from the interrupt controller 116 to the instance of the application 108. Further, the partition controller 202 can determine from the information received from the global controller 104 which event state data to retrieve from the state data data store 110. A partition controller 202 can access the state data in the state data data store 110 and send the retrieved state data to the application instance 108. The application instance 108 may then begin to execute for the element and return the data back to the global controller 104 or to the element requiring the execution.

Figure 3:
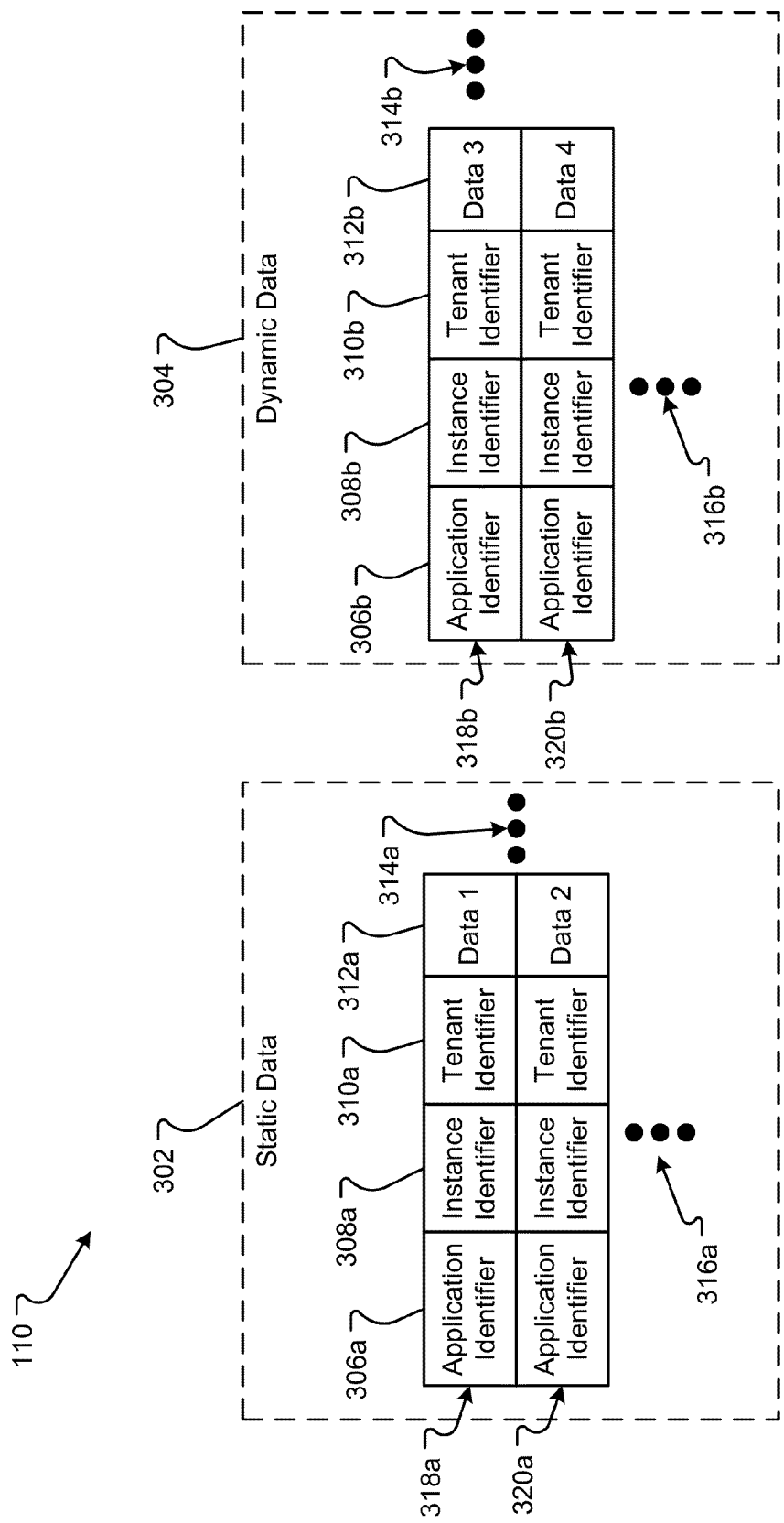
FIG. 3 is a logical block diagram of an embodiment of a data store of state data.

A state data data store 110 is described and shown in FIG. 3. State data can have one or more different types of data. For example, the state data 300 can include static data 302 and/or dynamic data 304. Static data 302 can be any data that remains necessarily unchanged during the execution of the application 108. The static data 302 may be used for the configuration of the application 108. Thus, the static data 302 remains static or unchanged. The static data 302 may be shared between one or more instances of the applications 108 as it may be common among several instances. The static data 302 can include one or more items of data 318, 320 for each instance. There may be more or fewer items of data 318, 320 than those shown in FIG. 3, as represented by ellipses 316. The items of data 318, 320 can include an identifier (ID) 306 for the application 108 to which the static data is associated, an instance ID 308 for the instance to which the static data is associated, an element ID 310 associated with the element(s) which the static data is associated, and data 312. Dynamic data 304 can include the same or similar information but that data may change over time. Thus, the dynamic data 304 is dynamic or is altered as the application 108 executes. As the dynamic data 304 includes the same information as the static data 301, the data elements will be described once for the static data 302 and dynamic data 304.

An application identifier 306 can be any identifier that can uniquely identify the application 108 amongst all other applications 108 in the virtualized environment 102. The application identifier 306 identifies applications 108 to which the data 312 is associated. The application identifier 306 can be any globally unique identifier (GUID), which may include numeric, alphanumeric, or other types of identifiers.

The instance ID 308 can be any GUID or other identifier that can identify the application instance 108 (which may be the same as the partition 106) to which the application data 312 is associated. Each application 108 may have one or more instances that are being executed simultaneously in different partitions 106 of the virtualized environment 102. Each instance may have an identifier 308 that identifies which partition 106 the instance is executing and/or the ID of the instance.

The tenant identifier 310 identifies the element which is using the instance. As such, the tenant identifier 310 may not exist for instances of data that are just being stored and not currently being used if the static data is shared among several application instances 108. The tenant identifier 310 may exist if the data 312 is specific to an element. The tenant identifier can be a GUID, numeric, alphanumeric, or other type of identifier that can identify the element uniquely among other elements.

The data 312 can be any data used by an application in execution. Further, a data 312 can include inputs or outputs, along with stored data. The static data 302 can include data 312 that remains unchanged and is stored permanently. The dynamic data 304 can include data that is changed or is modified as the application instance runs. As such, the dynamic data 312b may be stored temporarily and then modified and restored as the application is executing. In embodiments, the application instance 108 communicates with the control program 114. The application instance 108 can inform the control program 114 when it reaches a stable state and may be stopped or paused in execution. At this time, the dynamic data 312b may be stored.

There may be more or fewer items within a data element 318, 320 than those shown in FIG. 3, as represented by ellipses 314. In alternative embodiments, the static data 302 is maintained in each partition 106 for each instance of the application 108. Thus, the static data 302 need not be loaded when an application instance 108 is executed. In embodiments, only the dynamic data 304 is stored in the state data data store 110 and is loaded into the partition 106 when an application instance 108 is executed.

Figure 4:
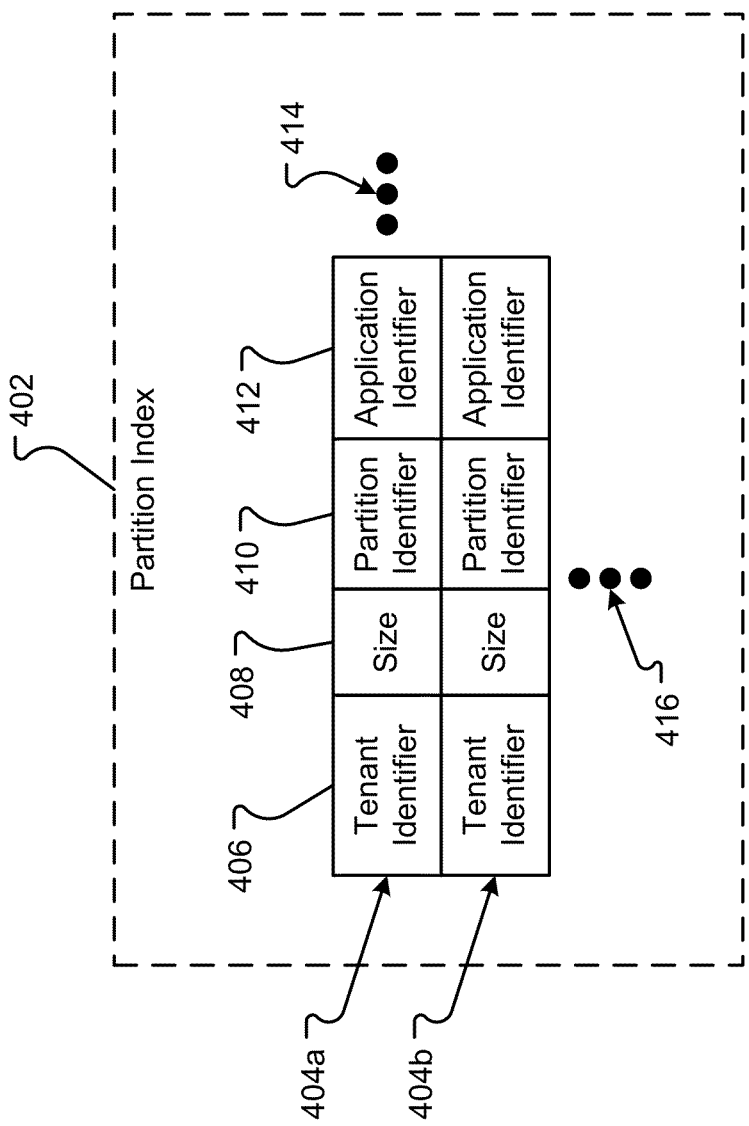
FIG. 4 is a logical block diagram of an embodiment of a partition index.

An embodiment of a partition index 402 that may be stored, retrieved, and read by the global layer 104 and/or control program 114 is shown in FIG. 4. Partition index 402 is operable to store information about what partitions 106 are executing which applications 108 and/or which partitions 106 are assigned to which elements. The partition index 402 may be created or changed by the partition allocator 204 when allocating or managing partitions 106 for the virtualized environment 102. After creation of the partition index 402, the partition controller 202 may enter information or change information within the partition index 402 based on how the partitions 106 are executing applications 108.

There may be one or more partition data elements 404 within the partition index 402. Each partition data structure 404 may contain information about a single partition 106a, 106b, etc. The information within a partition data element 404 can include a tenant identifier 406, a size 418, a partition identifier 410 and/or an application identifier 412.

The tenant identifier 406 can be the same or similar to tenant identifier 310. Thus, the tenant identifier 406 can be any type of GUID or other identifier that can identify the element which is assigned to the partition 106. Thus, any information, events, and/or interrupts from or to the element can be sent to or received from the correct partition 106. The tenant identifier 406 may not be included within the partition data structure 404 when the application is sitting idle waiting for an element to execute it.

The size 418 can include a size of a partition 106, given in Megabytes of memory being used and/or amount of storage needed. The size 418 can also be dictated by the number of CPU cycles or other measure needed to change or define the partition 106. The partition size 408 can be dictated by the partition allocator 204. The partition allocator 204 can define the size by running one or more algorithms based on usage or other information, as described in conjunction with FIG. 5.

The partition identifier 410 can be an identifier that is a GUID or other type of identifier that uniquely identifies that partition 106 amongst all the partitions 106 in the virtualized environment 102. The partition identifier 410 can identify any of the partitions 106a, 106b, etc., as shown in FIG. 1. Thus, the partition identifier 410 is able to associate the element to the application 108 executing in the partition 106.

The application identifier 412 can be the same or similar to application identifier 306. Thus, the application identifier 412 can be any GUID or other identifier that uniquely identifies the application amongst other applications that may be executed in the partition 106.

Figure 5:
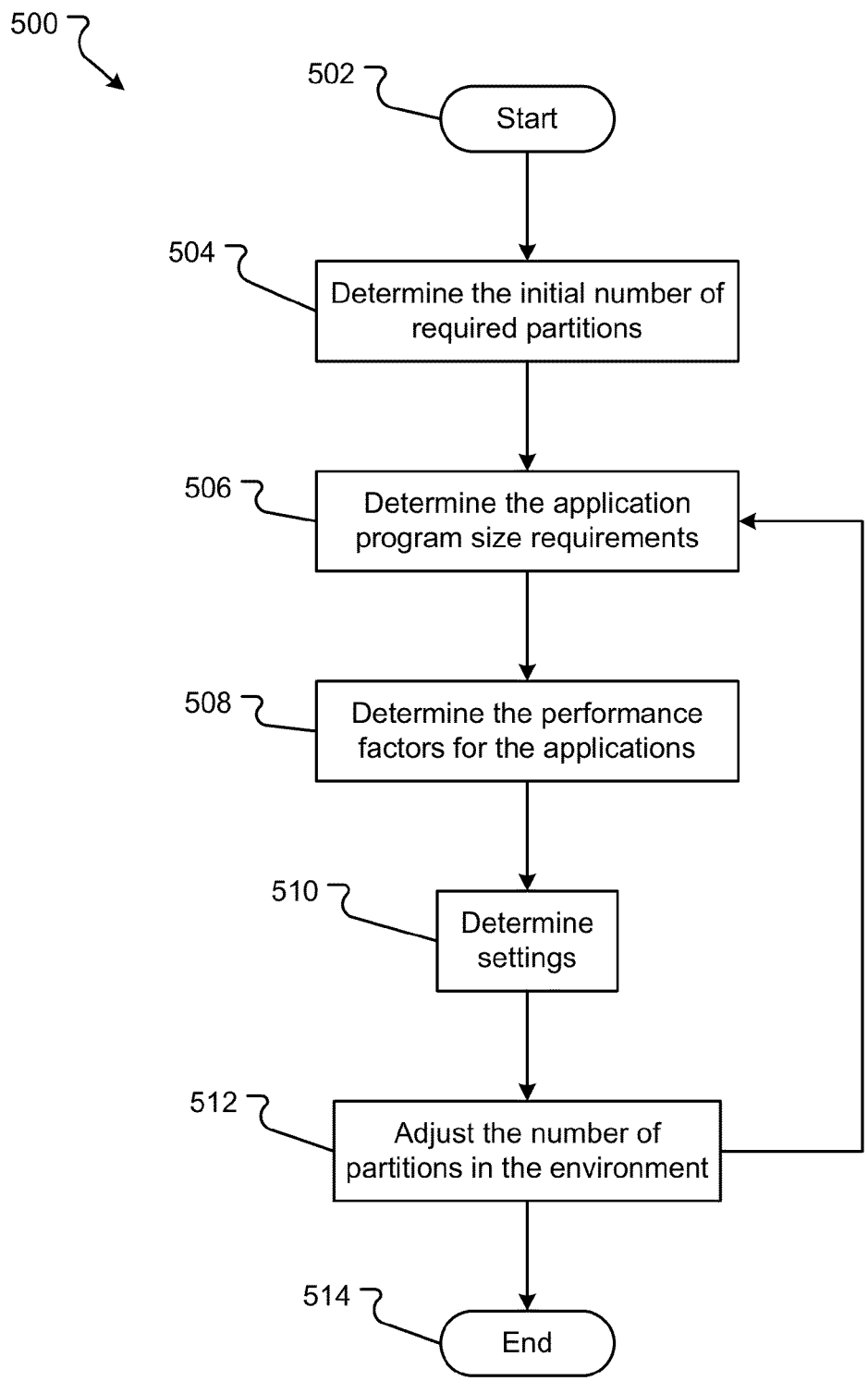
FIG. 5 is a flow diagram of an embodiment of a process for creating and managing partitions in a virtualized environment.

An embodiment of a method 500 for creating and managing partitions 106 in a virtualized environment 102 is shown in FIG. 5. While a general order for the steps of the method 500 is shown in FIG. 5. Generally, the method 500 starts with a start operation 504 and ends with an end operation 514. The method 500 can include more or fewer steps or can arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, user interfaces, etc. described in conjunction with FIGS. 1-4.

The partition allocator 204 determines the number of required partitions, in step 504. The partition allocator 204 can determine the number of applications 108 (e.g., the number of different types of applications) that need to be run and the number of instances of applications 108 (e.g., the number of instances of the same type of application) that need to be run based on initial requirements provided by one or more users or elements. These initial partitions 106 may be created and applications 108 may be initiated and run in those partitions 106. Available space in the state data data store 110 may be created along with the creation of the partition index 402. Each created partition 106 can be listed in a partition index 402, and the partition index 402 can be provided to the partition controller 202 and the interrupt controller 116.

At some time thereinafter, the program size for each of the applications can be determined by the partition allocator 204, in step 506. The program size may be the amount of memory used by an application instance 108 in the partition 106. Further, the program size can also be determined by the amount of state data stored in the state data data store 110. The size may reflect a needed change in the number of partitions 106 by either increasing or decreasing the partitions 106 based on the size of the programs.

The partition allocator 204 can also evaluate other factors that may require changes in the partitions 106. For example, the partition allocator 204 can determine the number of events being received by the global controller 104 and processed through the control program 114. These events may have a set duration for execution. For example, an event may take fractions of a second or a certain number of processor cycles to complete. The partition allocator 204 can determine a usage of the processor in the virtualized environment 102 by multiplying the number of events by the durations to determine a total amount of time or processor cycles used for all events. This amount of usage can then be used to determine how many partitions 106 are needed. For example, if an element requires 100 events to be executed and each event requires a second to process the event, the virtualized environment 102 uses 50 seconds to process all the events. As such, there may need to be only a single partition 106 to provide all of the processing for those element events.

Other factors may include the number of partitions 106 needed to execute simultaneously received events. In the previous example, if two events are received at the same time but only one application instance 108 is available, one of the elements may not have the event processed. As such, at least two partitions 106a, 106b, regardless of the amount of time used, may be needed to insure the availability of an application instance 106 for an element event. Further, based on the time of day, time of year, time of the month, etc., the amount of processing may change. For example, the number of events during nighttime hours may decrease significantly. Thus, the partition allocator 204 may change the number of partitions 106 provided to a certain application instance 108 based on the time of day, thus, decreasing the application instances 108 at night and increasing them during the day. The partition allocator 204 can also manage the number of partitions 106 based on the amount of memory provided for the virtualized environment 102. There may be other factors that are used to determine the number of partitions 106.

The partition allocator 204 may also review settings provided by a user or administrator to change the number of partitions 106, in step 510. For example, the user may set a requirement for a threshold upon which more partitions 106 are needed. For example, if an application partition 106 is used more than 50% of the available time (the set threshold), a new partition 106 may need to be created. Further, the required availability may be predetermined and/or set by the user. For example, a user can set an availability requirement that at least one instance of an application 108 must be available if two or more events occur simultaneously. Likewise, if the user sets an availability requirement for four simultaneous events, the partition allocator 204 can create four different partitions 106 for four instances of the same application 108. Thus, the user can direct the partition allocator 204 to change the number of partitions 106 based on different settings.

Upon reviewing the program size, the factors, and the settings, the partition allocator 204 can adjust the number of partitions 106, in step 512. If the partition allocator 204 determines that more partitions 106 are required, the partition allocator 204 can add a partition data element 404 to the partition index 402. If fewer partitions 106 are required, the partition allocator 204 can eliminate one or more partition data elements 404 from the partition index 402. Partition allocator 204 can then pass the changed or modified partition index 402 to the partition controller 202 and the interrupt controller 116 to change the function of those components when events are received. The partition allocator 204 can adjust the number of partitions 106 periodically or continuously based on information received and evaluated by the partition allocator 204. After adjusting the number of partitions 106, the partition allocator 204 can return to determining the program size, in step 506, and repeat steps 506, 508, and/or 510, to determine if further adjustments are necessary.

Figure 6:
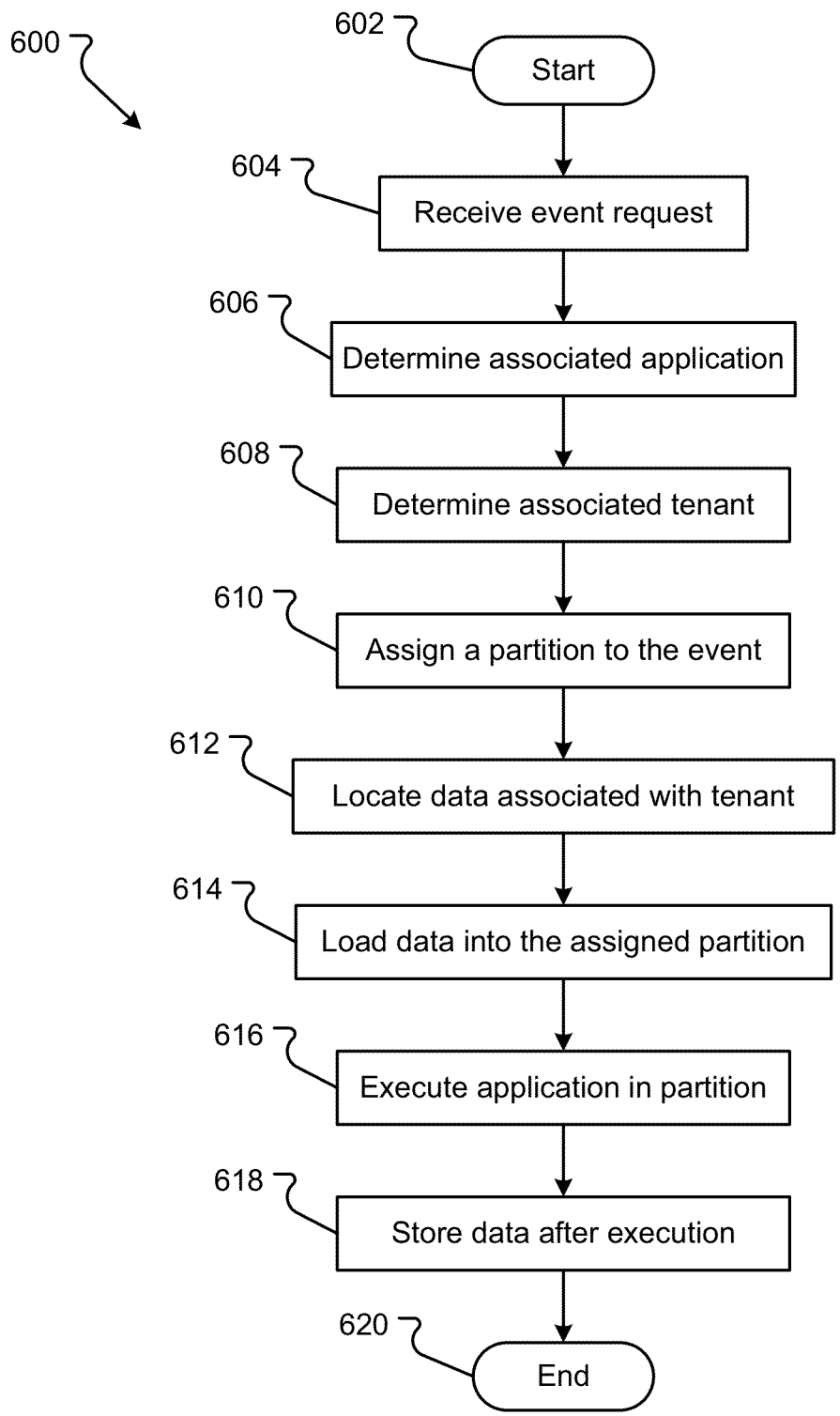
FIG. 6 is a flow diagram of an embodiment of a process for executing application instances in a partitioned virtualized environment.

An embodiment of a method 600 for creating and managing partitions 106 in a virtualized environment 102 is shown in FIG. 6. While a general order for the steps of the method 600 is shown in FIG. 6. Generally, the method 600 starts with a start operation 604 and ends with an end operation 620. The method 600 can include more or fewer steps or can arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, software, data structures, user interfaces, etc. described in conjunction with FIGS. 1-4.

An interrupt controller 116 of the global controller 104 receives an event request, in step 604. The event request can be any type of request for an application 108 to execute to provide data or other service. The event request can be from an element and can be accompanied by data that identifies the tenant, the application 108, and includes data from the element for the event request. The interrupt controller 116 can pass this information on to the partition controller 202. The partition controller 202 can parse the information and read the application identifier identifying the application 108 requested to determine the partition 106, in step 606. The determined application 108 may then be found in the partition index in the application identifier 412. Thus, the partition controller 202 can determine which partitions may be executing instances of an application.

Further, the partition controller 202 can also identify which application configuration may be best to send the event request. As shown in FIG. 1C, several different configurations of an application 108 may be executed in different partitions 106. Each configuration may provide different capabilities, that is, one configuration may include all of an application's features and capabilities (e.g., is the superset of the application). Another configuration may include a subset of the possible features and/or capabilities, i.e., be less capable than the superset application. Thus, depending on the event request, the partition controller 202 may determine the application configuration that is best able to handle the event request. This determination can factor in the availability of the application instance, the complexity or needed capabilities for the event request, or other information related to the application configuration or the event request. Thus, the partition controller 202 can better utilize and target partitions based on the types of application instances being executed.

The partition controller 202 can also identify the tenant(s), in step 608. In determining a tenant from the information provided from the interrupt controller 116, the partition controller 202 can determine the data, both static data 302 and/or dynamic data 304, that needs to be loaded into a partition 106 to allow an instance of an application 108 to execute for the element. Further, the partition controller 202 may also determine if the tenant is currently uploaded and/or executing in a partition and is, thus, associated with the tenant and the event request. Upon determining an empty or tenant-associated partition 106 (e.g., a partition without a current element ID 406 assigned), the partition controller 202 can assign the event request to the partition 106. The partition controller 202 can target a certain application instance 108 to execute for the tenant.

Further, at one time, the partition controller 202 can load an event request associated with a particular tenant into a first partition. Then the partition controller 202 can load a second event request, received at a second time, into a second partition, even if the second event request is also associated with the particular tenant. Further still, the partition controller 202 can load several different sets of tenant data into a single partition and allow the application 108 in the partition 106 to multi-thread the execution of event requests associated with the several tenant data sets. This multi-threading allows long processing events to be loaded but allows the application to continue to execute on other event requests.

The partition controller 202 may then assign a partition 106 and the partition's application instance 108 to handle the request from the element by assigning the element ID 406 (of the requesting element) to a partition data element 404 associated with the partition 106. Thus, the partition controller 202 fills out or completes the partition data element 404 with the element ID 406 to assign the partition 106 the task of handling the request. Thereinafter, the partition controller 202 can pass the request, the static data 302, and the dynamic data 304 to the application instance 108 to allow the application instance 108 to begin executing.

To execute the application instance 108, the partition controller 202 first locates the tenant's data in the static data 302 and/or the dynamic data 304, in step 612. As explained, the partition controller 202 searches for the tenant ID 310, in the static data 302 and/or the dynamic data 304, and provides the data elements 312, associated with the tenant, to the application instance 108. In embodiments, the partition controller 202 may also save the data received with the event request into the dynamic data 304. Upon locating all data required by the application 108, the partition controller 202 can load the data into a partition 106.

The partition controller 202 can provide the application instance 108 with one or more pointers to the static data 302 and/or dynamic data 304 to let the application 108 begin executing, in step 614. The application instance 108 may then begin executing, with the static data 302 and dynamic data 304, and processing the event request, in step 616. Upon completing the execution or processing the request and reaching a steady state, the application instance 108 can inform the partition controller 202 that the processing is completed. Any information required by the element may be passed through the global controller 104 or passed directly to the element. Upon reaching the steady state, the partition controller 202 can then receive the new dynamic data 304 and store the new dynamic data 304 for future use, in step 618. The partition controller 202 can update the dynamic data 304 by changing data elements 312 within the dynamic data 304. The saving of data after execution frees the application instance 108 to execute for a different tenant or process a different request at a future time. Further, the data 302/304 is maintained for the tenant to come back and request a new event request be processed at some future time.

Figure 7:
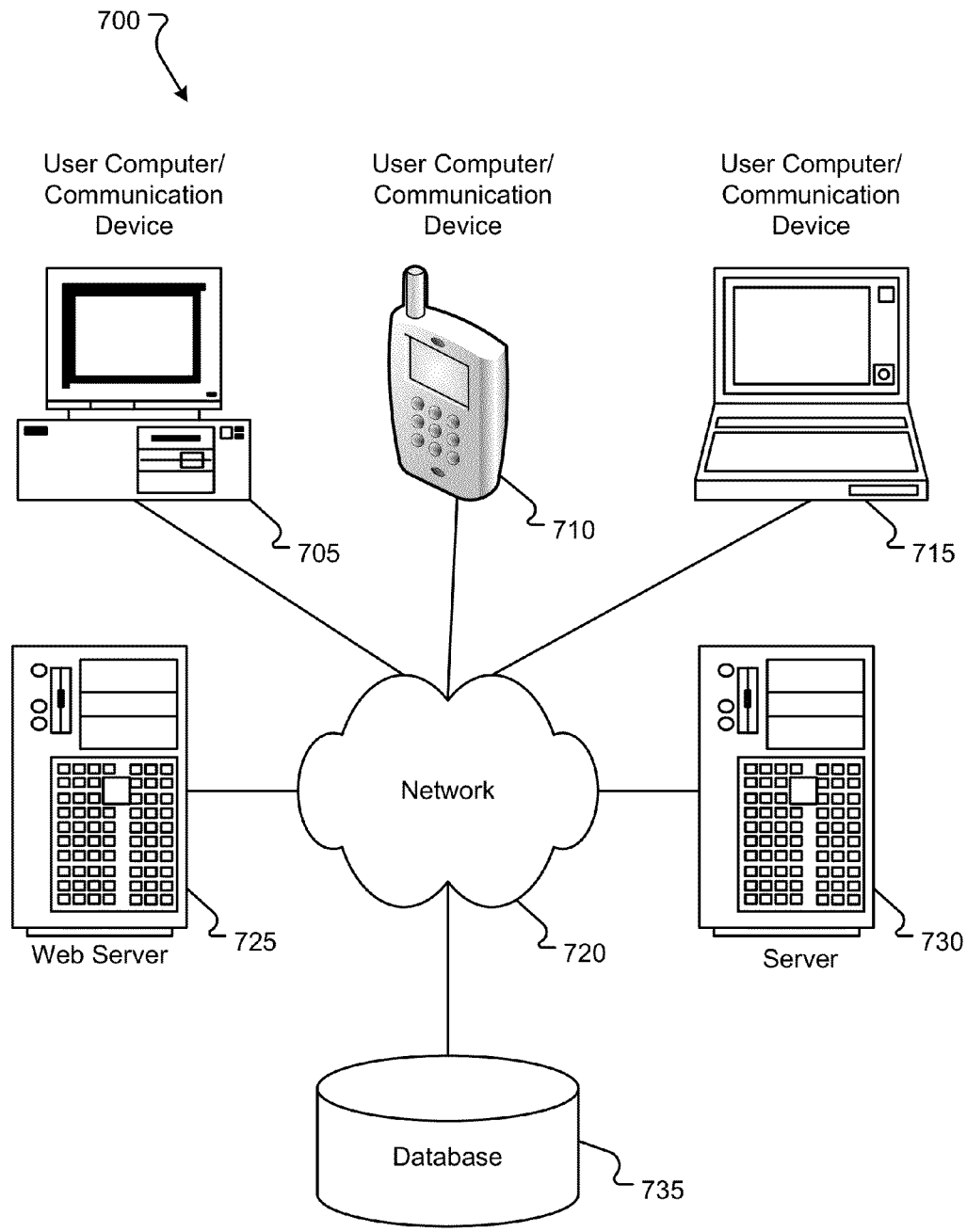
FIG. 7 is a block diagram of an embodiment of a computing environment operable to execute the virtualized environment.

FIG. 7 illustrates a block diagram of a computing environment 700 wherein the systems, devices, servers, software modules, etc. may execute. As such, the system or components described in conjunction with FIG. 7 may be commodity hardware. The computing environment 700 includes one or more user computers 705, 710, and 715. The user computers 705, 710, and 715 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network (e.g., the network 720 described below) and/or displaying and navigating web pages or other types of electronic documents. Although the exemplary computing environment 700 is shown with three user computers, any number of user computers may be supported.

Computing environment 700 further includes a network 720. The network 720 can be any type of network familiar to those skilled in the art that can support data communications using any of a variety of commercially-available protocols, including without limitation SIP, TCP/IP, SNA, IPX, Apple-Talk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 702.11 suite of protocols, the Bluetooth™ protocol known in the art, and/or any other wireless protocol); and/or any combination of these and/or other networks. The network 720 may be the same or similar to network 107.

The system may also include one or more server computers 725, 730. One server may be a web server 725, which may be used to process requests for web pages or other electronic documents from user computers 705, 710, and 720. The web server can be running an operating system including any of those discussed above, as well as any commercially-available server operating systems. The web server 725 can also run a variety of server applications, including SIP servers, HTTP servers, FTP servers, CGI servers, database servers, Java servers, and the like. In some instances, the web server 725 may publish operations available operations as one or more web services.

The computing environment 700 may also include one or more file and or/application servers 730, which can, in addition to an operating system, include one or more applications accessible by a client running on one or more of the user computers 705, 710, 715. The server(s) 730 may be one or more general purpose computers capable of executing programs or scripts in response to the user computers 705, 710 and 715. As one example, the server may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the web application server 730 may be forwarded to a user computer 705 via a web server 725. Similarly, the web server 725 may be able to receive web page requests, web services invocations, and/or input data from a user computer 705 and can forward the web page requests and/or input data to the web application server 730. In further embodiments, the server 730 may function as a file server. Although for ease of description, FIG. 7 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, file server 725 and/or application server 730 may function as the active host 102 and/or the standby host 107.

The computing environment 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. In a particular set of embodiments, the database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. In one set of embodiments, the database 735 may be a relational database, such as Oracle 10i™, that is adapted to store, update, and retrieve data in response to SQL-formatted commands.

Figure 8:
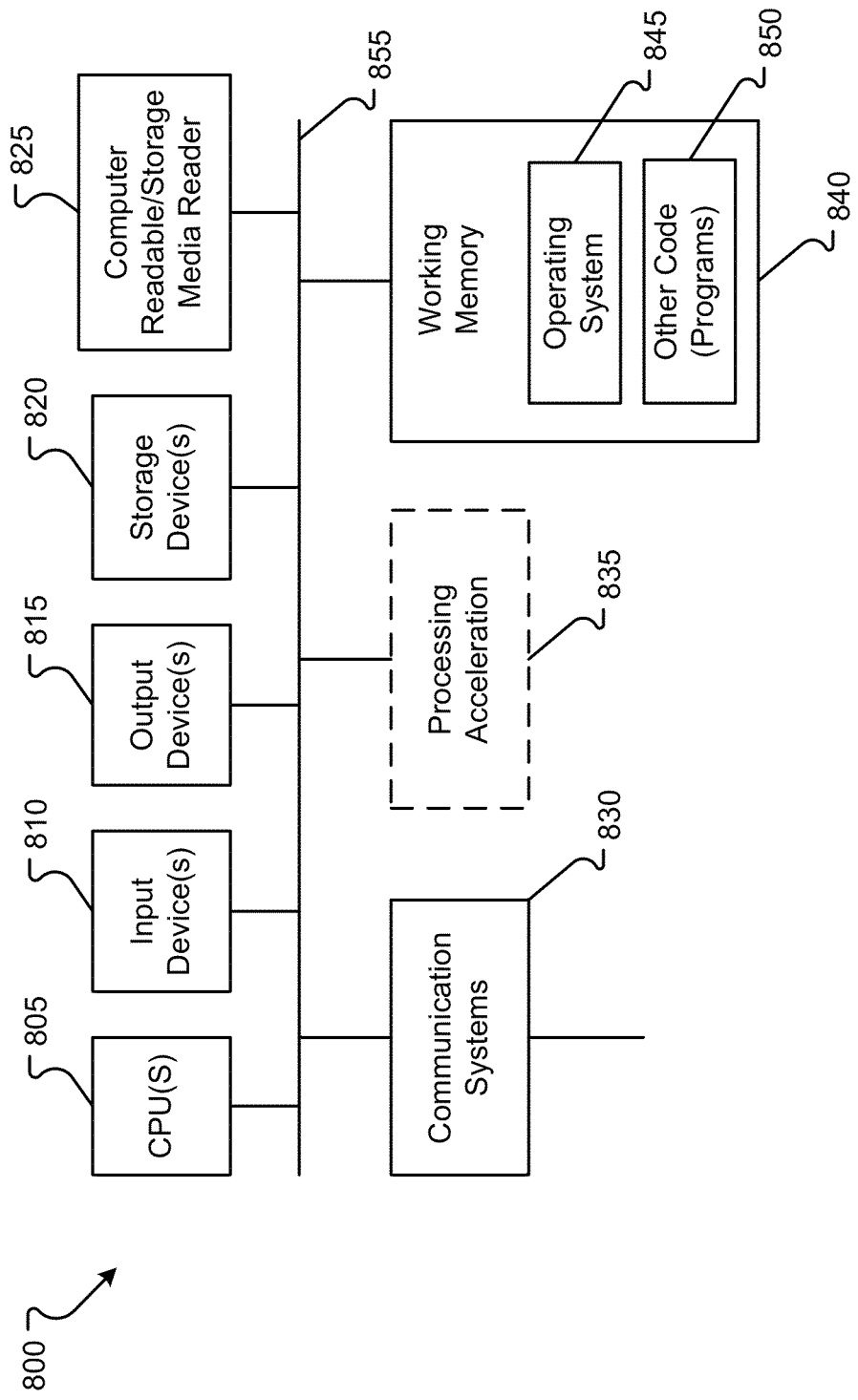
FIG. 8 is a block diagram of an embodiment of a computer operable to execute as a server that operates a virtualized environment.

FIG. 8 illustrates one embodiment of a computer system 800 upon which the systems, devices, servers, software modules, etc. described herein may be deployed or executed. The computer system 800 is shown comprising hardware elements that may be electrically coupled via a bus 888. The hardware elements may include one or more central processing units (CPUs) 808; one or more input devices 810 (e.g., a mouse, a keyboard, etc.); and one or more output devices 818 (e.g., a display device, a printer, etc.). The computer system 800 may also include one or more storage devices 820. By way of example, storage device(s) 820 may be disk drives, optical storage devices, solid-state storage devices such as a random access memory ("RAM") and/or a read-only memory ("ROM"), which can be programmable, flash-updateable and/or the like.

The computer system 800 may additionally include a computer-readable storage media reader 828; a communications system 830 (e.g., a modem, a network card (wireless or wired), an infra-red communication device, etc.); and working memory 840, which may include RAM and ROM devices as described above. In some embodiments, the computer system 800 may also include a processing acceleration unit 838, which can include a DSP, a special-purpose processor, and/or the like.

The computer-readable storage media reader 828 can further be connected to a computer-readable storage medium, together (and, optionally, in combination with storage device (s) 820) comprehensively representing remote, local, fixed, and/or removable storage devices plus storage media for temporarily and/or more permanently containing computer-readable information. The communications system 830 may permit data to be exchanged with the network 420 and/or any other computer described above with respect to the computer system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 848 and/or other code 880. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments n have been described in detail herein, it is to be understood that the concepts may be otherwise variously embodied and employed, and that the appended claims are intended to be construed to include such variations, except as limited by the prior art.

What is claimed is:

1. A computer program product including computer executable instructions stored onto a non-transitory computer readable medium which, when executed by a processor of a computer, cause the computer to perform a method for executing an application instance in a virtualized environment, the instructions comprising:
   instructions to receive an event request associated with an element;
   instructions to determine an application associated with the event request;
   instructions to determine a tenant associated with the event request;
   instructions to assign a partition to execute the application instance of the application for the event request;
   instructions to create a partition index for the assigned partition, wherein the partition index is used to store information about the assigned partition;
   instructions to load data associated with the tenant into the partition for execution of the application instance; and
   instructions to execute the application instance in the partition to process the event request.

2. The computer program product as defined in claim 1, wherein the data is tenant state data.

3. The computer program product as defined in claim 2, wherein the tenant state data is one or more of the group consisting of static data and dynamic data.

4. The computer program product as defined in claim 3, further comprising instructions to locate the tenant state data in a state data data store.

5. The computer program product as defined in claim 4, wherein the tenant is identified by a tenant identifier.

6. The computer program product as defined in claim 5, wherein locating the tenant state data comprises instructions to locate one or more state data data elements that include the tenant identifier.

7. The computer program product as defined in claim 6, further comprising:
   instructions to determine the application instance has reached a steady state; and
   instructions to store new tenant state data, created during the execution of the application instance, in the state data data store.

8. The computer program product as defined in claim 7, wherein the virtualized environment includes two or more partitions.

9. The computer program product as defined in claim 8, wherein at least one partition executes a second application instance associated with the application.

10. The computer program product as defined in claim 8, wherein at least one partition executes a third application instance associated with a second application.

11. The computer program product as defined in claim 1, wherein the stored information in the partition index comprises information about the application and the element.

12. The computer program product as defined in claim 1, wherein the application is one of a plurality of versions of the application and a class of the partition is determined based on the version of the application and one or more classes of available partitions.

13. The computer program product as defined in claim 1, wherein the partition index includes a size of the partition and wherein the size of the partition is dictated by a number of Central Processing Unit (CPU) cycles.

14. The computer program product as defined in claim 1, wherein the event is a number of events and wherein the partition is determined based on the number of events.

15. The computer program product as defined in claim 14, wherein the number of events is also based on a number of simultaneous events.

16. A computing system, comprising:
   at least one memory; and
   at least one processor in communication with the at least one memory, the at least one processor configured to execute a virtualized environment, the virtualized environment comprising:
      a partition, wherein the partition executes an instance of an application and includes at least one set of tenant data;
      a state data data store operable to provide state data to the partition; and
      a control program in communication with the partition and the state data data store, the control program configured to:
         receive an event request from an element;
         determine an application associated with the event request;
         determine a tenant associated with the event request;
         assign a partition to execute an application instance of the application for the event request;
         create a partition index for the assigned partition, wherein the partition index is used to store information about the assigned partition; and
         load the tenant data associated with the tenant, from the state data data store, into the partition for execution of the application instance.

17. The computing system as defined in claim 16, further comprising a global controller in communication with the virtualized environment, wherein the global controller receives the event request from the element and provides the event request and event information to the control program.

18. The computing system as defined in claim 17, wherein the global controller includes an interrupt controller to receive interrupt event requests.

19. The computing system as defined in claim 18, wherein the virtualized environment includes two or more partitions, wherein each partition executes a same application, and wherein at least one instance of the application in at least one partition is configured differently from at least one other instance of the application in at least one other partition.

20. The computing system as defined in claim 19, wherein at least one partition executes an instance of an application and two or more sets of tenant data, wherein the control program directs the event request to one of the two or more tenants, wherein the application instance swaps in the tenant data as directed by the control program.

* * * * *